March 22, 1960 W. M. CARTER ET AL 2,929,589
PARACHUTE DISREEFING APPARATUS
Filed Oct. 26, 1956 4 Sheets-Sheet 3

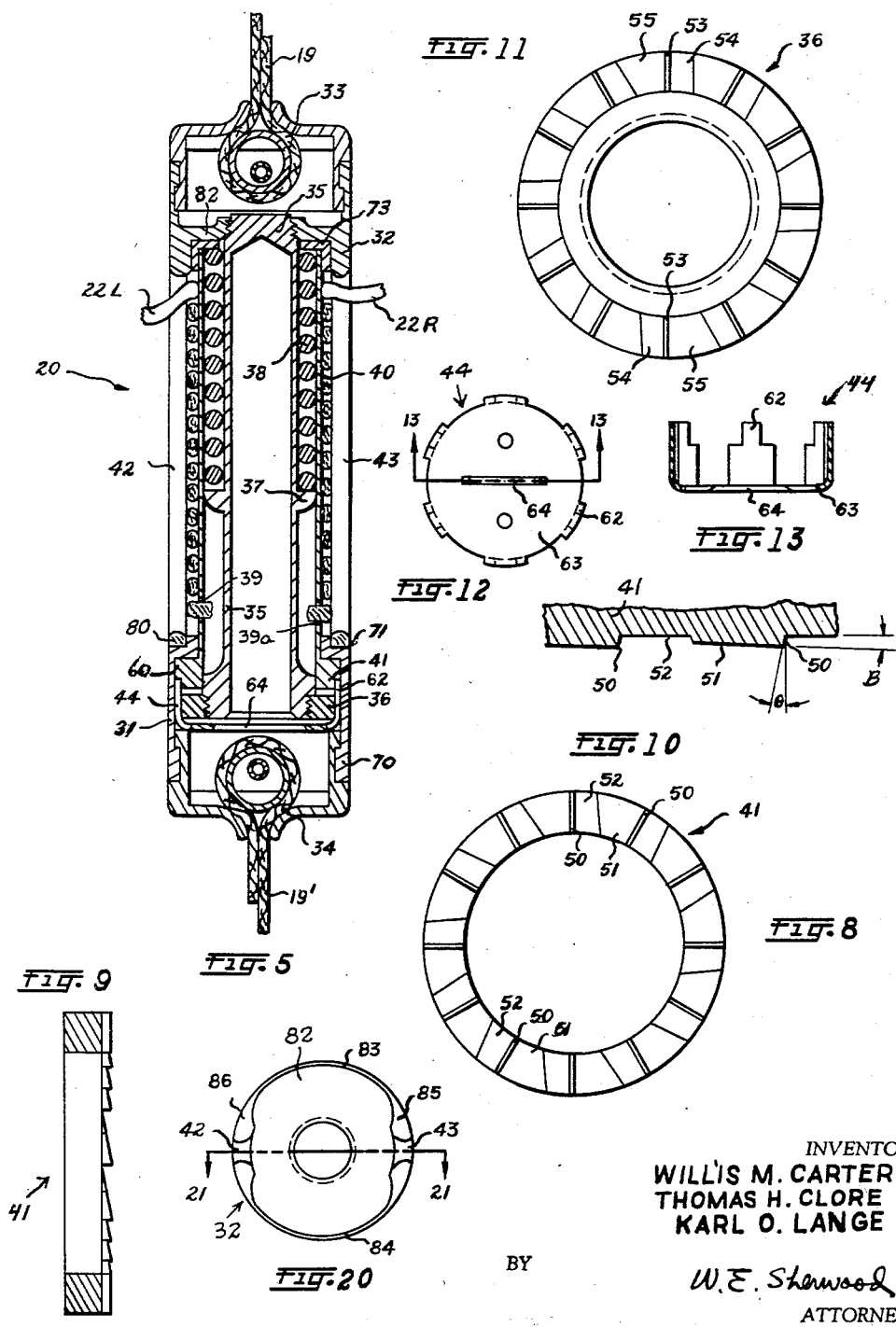

INVENTORS
WILLIS M. CARTER
THOMAS H. CLORE
KARL O. LANGE
BY W. E. Sherwood
ATTORNEY

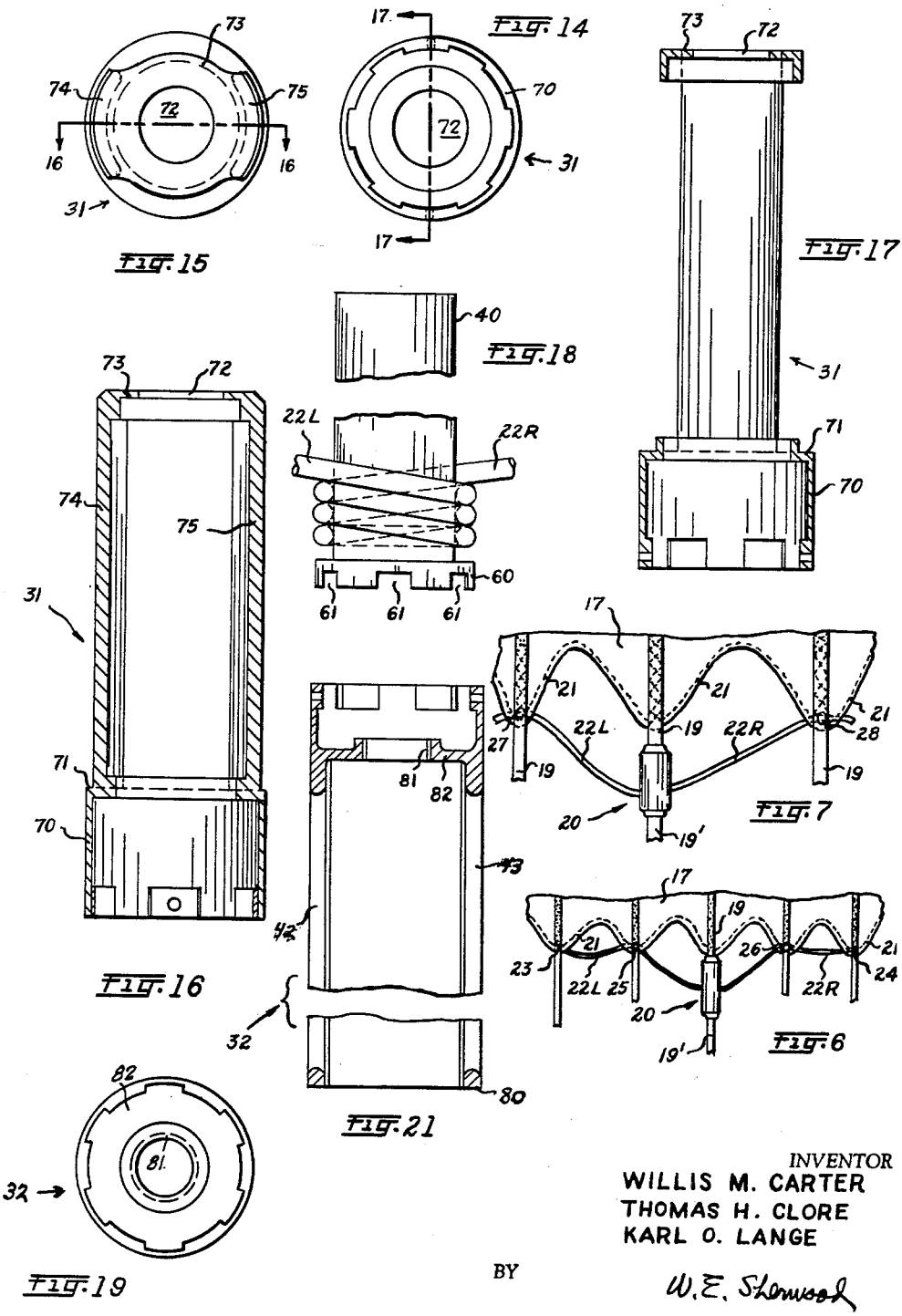

United States Patent Office 2,929,589
Patented Mar. 22, 1960.

2,929,589

PARACHUTE DISREEFING APPARATUS

Willis M. Carter, Thomas H. Clore, and Karl O. Lange, Lexington, Ky., assignors to The Kentucky Research Foundation, Lexington, Ky., a corporation of Kentucky Application October 26, 1956, Serial No. 618,496

16 Claims. (Cl. 244—152)

This invention relates to a new and improved parachute disreefing apparatus and more particularly to an apparatus in which the disreefing operation is substantially continuous. The invention is especially useful with parachutes released from high speed aircraft at high altitudes, or with parachutes carrying heavy loads, or in these combined usages.

As is known, in selecting a parachute for a particular purpose, consideration is given to the factors of release velocity, release height, weight and type of body being handled, body terminal velocity and the "g" loading allowable on the body and on the parachute. Normally, the factors of release velocity and terminal velocity are mutually opposed in the sense that a parachute selected to give an acceptably low shock load on opening at high release velocity will give an unacceptably high terminal velocity, and to give an acceptably low terminal velocity will give an unacceptably high shock load at opening. This problem has, within limits, been partially solved by the conventional use of parachute reefing, but so far as we are aware, all such apparatus heretofore proposed for this purpose has certain disadvantages when used for high release velocities and heavy loads, and which disadvantages it is a purpose of our invention to overcome.

In addition to usage with parachutes completely detached from aircraft, the invention is useful with the well known brake parachute systems in which the slowing of the aircraft is an objective.

An object of our invention is to provide an improved parachute disreefing apparatus in which the disreefing operation is substantially continuous, in contrast to an operation having distinct spaced steps of disreefing.

Another object is to provide an improved parachute disreefing apparatus which automatically controls the rate of canopy inflation in order to maintain a constant, predetermined parachute force regardless of altitude and velocity release conditions.

Another object is to provide a disreefing apparatus having a disreefer for paying out the disreefing line simultaneously in two directions.

Another object is to provide a disreefing apparatus having a disreefer interposed between the parachute canopy and the parachute load suspension line.

Another object is to provide a reusable disreefing apparatus including a reusable disreefing line housed in a reusable disreefer.

Another object is to provide a disreefer constructed for eliminating twisting of the assembly as the disreefing line is payed out.

Another object is to provide a disreefer in which excessively high temperature, or abrasion, of the disreefing line, due to the heat or mechanical abrading of friction, is substantially reduced.

A further object is to provide a disreefer in which the disreefing line may be readily stored prior to usage and restored for a subsequent usage.

A further object is to provide a light weight parachute disreefer.

Other features and advantages of our invention will be apparent in the following detailed description of the presently preferred construction shown in the accompanying drawings in which:

Fig. 5 is a sectional view of the assembled disreefer of our invention with the disreefing line in stored condition prior to use.

Fig. 6 is a detail view showing one arrangement for mounting the disreefer on the parachute canopy.

Fig. 7 is a detail view showing a second arrangement for mounting the disreefer on the parachute canopy.

Fig. 8 is a face view of the upper clutch member.

Fig. 9 is a side view of the upper clutch member.

Fig. 10 is a detail, to an enlarged scale, of a tooth of the upper clutch face.

Fig. 11 is a face view of the lower clutch member.

Fig. 12 is a plan view of the outer face of the winder member.

Fig. 13 is a sectional view of the winder taken on line 13—13 of Fig. 12.

Fig. 14 is a plan view of the bottom of the lower housing guide.

Fig. 15 is a plan view of the top of the lower housing guide.

Fig. 16 is a sectional view taken on line 16—16 of Fig. 15.

Fig. 17 is a sectional view taken on line 17—17 of Fig. 14.

Fig. 18 is an elevation view of the spool member, with a portion of the disreefing line in stored position thereon.

Fig. 19 is a plan view of the top of the upper housing guide.

Fig. 20 is a plan view of the bottom of the upper housing guide, and

Fig. 21 is a sectional view taken on line 21—21 of Fig. 20.

As used herein, the term "aircraft" is intended to cover any type of conveyance from which a parachute equipped with a disreefer is to be detached, or is to remain attached when acting as a brake; the term "disreefer" is intended to refer generally to the assembled apparatus as shown in Fig. 5; and the term "braking mechanism" is intended to refer to force responsive means permitting a disreefing line to be payed out intermittently.

According to our invention, each disreefing line is payed out so as to maintain a constant parachute force, rather than being payed out at stated time intervals. A plurality of such disreefing lines are preferably employed, although a single line may be used under less arduous conditions without departing from the invention. When a plurality of disreefers are used, each disreefer preferably is spring loaded uniformly so as to become operable under the same drag force condition. Each disreefer, moreover, is of a light weight material, preferably aluminum, except for the spring and certain braking mechanism components, such as clutch faces. In addition, each disreefer and disreefing line are reusable.

Figure 1:
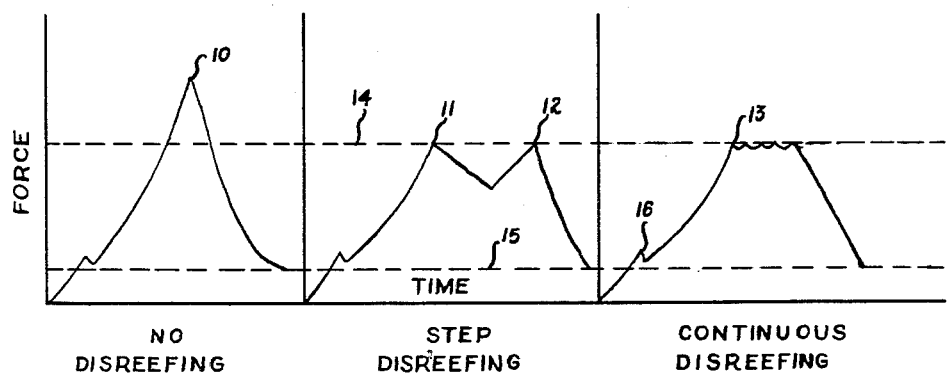
Fig. 1 is a chart indicating the general relationship of force versus time in parachute loadings.

Considering now Fig. 1 (not shown to scale), there is shown three conditions under which parachutes having a body carried thereby may be opened, the drag force being plotted as an ordinate against opening time as an abscissa. As is known, the change in momentum of the parachute system is equal to the time integral of the drag force, which corresponds to the area under the force-time curve. To obtain the most efficient opening at optimum release velocity and terminal velocity, the maximum allowable value of force should be maintained, but not exceeded. Accordingly, a very large number of small step disreefing periods would be most desirable and this maybe approximated by the teachings of the present invention in which the reefing line is payed out whenever the force of the parachute loading diminishes to a predetermined value.

This objective will be noted when contrasting the left-handmost curve of Fig. 1, indicating a parachute system with no disreefing; with the central curve indicating a system with a single disreefing period; and with righthandmost curve indicating a system employing the present invention. For example, when no reefing and disreefing is used, the parachute receives a sudden heavy shock having a large force value 10, but is fully opened and reaches its terminal velocity force value indicated by line 15, in the shortest period of time. When conventional step disreefing, as indicated by the central curve, is used, the parachute receives, for example, two spaced shocks having force values 11 and 12, neither of which is as large as value 10, but takes a longer time to fully open and to reach terminal velocity.

When substantially continuous disreefing in accordance with our invention is employed, the force reaches a maximum shock value 13 which is thereafter maintained at a substantially constant value until the parachute is opened, but the parachute takes less time than in the case of the step disreefing to open fully and to reach terminal velocity and with the advantage that the maximum allowable parachute loading is never exceeded.

Figures 2, 3, 4:
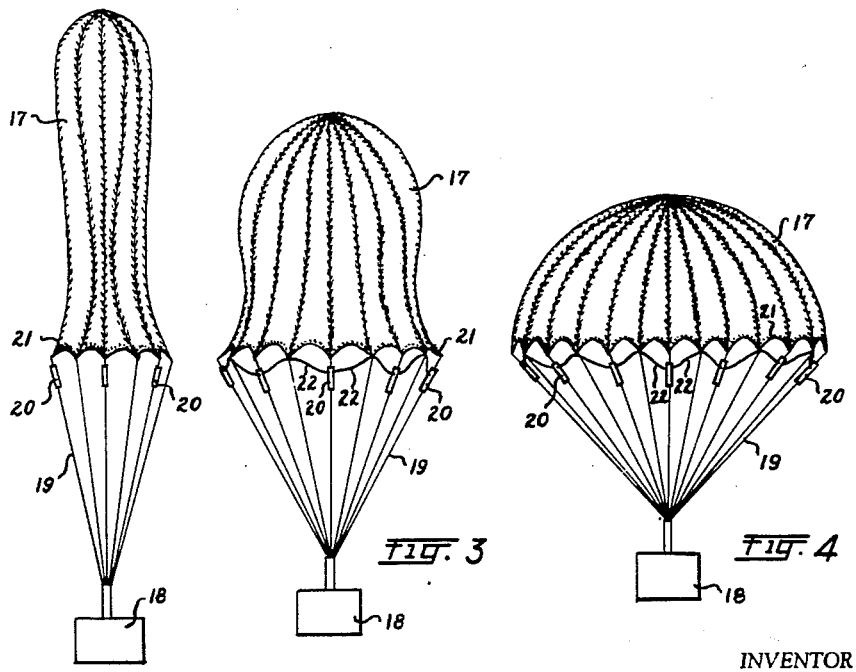
Fig. 2 is a diagrammatic view of a fully reefed parachute.
Fig. 3 is a diagrammatic view of a partially disreefed parachute.
Fig. 4 is a diagrammatic view of a fully disreefed parachute.

As indicated in Fig. 2, when a parachute system employing our invention is deployed from the aircraft or the deployment bag thereon, it first reaches a force value 16 (Fig. 1), due essentially to the drag area of the uninflated canopy 17, snatch load 18, and suspension lines 19, as it encounters the air stream and as the restraining or ejection means performs its function. Instantly thereafter the air enveloped in the canopy distends the same and the force value 13 is attained. At this time, the improved disreefer, later to be described, comes into operation and thereafter the parachute system moves through the air, each increment of decreased force applied to an increment of canopy surface being offset by an increased increment of additional canopy surface made available by the paying out of the disreefing line. As the disreefer operates, the parachute canopy is progressively opened as it approaches terminal velocity, one intermediate stage of opening being shown in Fig. 3.

The parachute system accordingly decelerates uniformly until it attains the terminal velocity with its fully opened condition, as seen in Fig. 4.

As will be understood by those skilled in the art, many physical phenomena are involved in the foregoing simplified empirical explanation and the above described operation, while correct to the best of our knowledge, may contain inaccuracies or omissions. Experience, however, has shown, by means of conventional recording instruments and visual observations, that our improved disreefer operates at a fast rate, and that the foregoing description appears to be constant with the known disreefer characteristics.

With the foregoing in mind, reference is now made to Figs. 6 and 7 in which our improved disreefer indicated generally at 20 is mounted in a suspension line 19 a few inches below the skirt 21 of canopy 17. The disreefer may be attached to the suspension line by any suitable means, in view of the lack of twisting inherent in our disreefers. However, we prefer to employ as a connection between each end of the disreefer and the suspension line, the improved connection shown in the copending application of Clore and Carter Serial No. 605,276, filed August 21, 1956, for Anchor Means for Lines.

A single disreefing line or cord 22 passes from the disreefer 20 in a manner later to be disclosed and is attached at its ends to the edge of the canopy at suitably reinforced points, such as the seam of the gore of the canopy. In Fig. 6 the line 22 is attached to the canopy with a spacing of five gores, as shown at attachment points 23 and 24. The ends of the gore seams immediately inboard of these points of attachment are provided with conventional reefing rings 25 and 26 through which the reefing line passes.

In Fig. 7, as a variation, the ends of the line are anchored at attachment points 27 and 28 to gore seams immediately adjacent the gore seam along which the disreefer is supported. One end of an adjacent line likewise is anchored at attachment point 27 and one end of another adjacent line likewise is anchored at attachment point 28. Any other arrangement wherein the ends of the disreefing line are attached to the parachute canopy at equal and opposite distances from the disreefer may also be employed and it is in the purview of our invention to employ only a single disreefer and disreefing line for a parachute, when this is desired.

We have found, however, that the speed at which a single disreefing line must be payed out in order to attain a reasonably fast approach to the terminal velocity of the parachute system, induces an undesirable amount of frictional heat in the disreefing line, as well as requiring a bulky disreefer for storage of the necessary length of line. We prefer to use a material such as Nylon for the disreefing cord and to shape this cord with a generally rectangular cross section. Material of this type is known to be affected adversely for subsequent usage if the friction generates a temperature therein in order of 250° F., but as will later appear, this value of frictionally generated heat is not attained in the normal operation of our disreefer.

Considering now Fig. 5, the disreefer 20 comprises a lower housing guide 31, more fully shown in Figs. 14 to 17, and an upper housing guide 32, more fully shown in Figs. 19 to 21 and the lower edge of the upper housing guide seated in normal position upon shoulder 71 of the lower housing guide. The improved connection, disclosed in the aforementioned Clore and Carter application and indicated generally at 33 and 34, serves to connect the upper and lower sections 19 and $19^1$ of the suspension line, to the upper housing guide and lower housing guide respectively. A cylindrically shaped stud 35 is mounted at its upper end in the upper housing guide 32 and at its lower end carries a braking mechanism such as the upwardly facing disc-like lower clutch 36 (Fig. 11), the purpose of which will later appear. While we prefer the use of a mechanical jaw clutch type of braking mechanism, it is within the purview of our invention to employ other known types of braking mechanisms, such as friction brakes, ball clutches, and the like.

Intermediate its ends, the stud is provided with a circumferential externally disposed abutment 37 adapted to hold compression spring 38 between the abutment and the upper interior shoulder 73 of the lower housing guide. For weight savings purposes, the stud is hollow and is provided with relatively thin end and wall sections sufficient to meet the stresses imposed on the apparatus but of no greater thickness than so required. Preferably, the stud is of metal chosen to give the optimum weight savings consistent with strength and these considerations likewise apply to the remainder of the disreefer structure. As a feature of our invention, the disreefer may be readily disassembled so that interchangeable springs 38 having different spring loadings may be substituted for different disreefing loads. Accordingly, the same disreefer assembly may be employed for different loadings merely by substitution of a different spring.

Surrounding the stud and disposed within the lower housing guide is a hollow spool 40, best shown in Fig. 18. At its lower end the spool has attached thereto, or formed integrally therewith, as part of the braking mechanism, a disc-like upper clutch 41 (Figs. 8 to 10) adapted to cooperate with the lower clutch 36. The disreefing line 22 passes through transverse holes 39 and 39a (Fig. 5) located centrally in the wall of spool 40 adjacent the lower end of the spool and both ends thereof are wound in the same direction about the periphery of the spool, passing outwardly from the disreefer, as shown at 22L and 22R. The upper or outermost housing guide 32, moreover, is provided with diametrically opposed vertical slots 42 and 43 through which the respective ends 22L and 22R of the disreefing line passes.

Surrounding the lower end of stud 35 is an upwardly directed cup shaped winder member 44, best shown in Figs. 12 and 13, and adapted for selective engagement with the lower end of spool 40 for a purpose later to appear.

Considering now Figs. 8 to 10, the annular upper clutch disc 41 is preferably formed integral with the spool but may be a separate element attached to the spool by any suitable means. A plurality of uniformly shaped and spaced teeth having an inclined radially directed wall 50, with a cam surface 51 leading to that wall, form the essential portions of the clutching mechanism, with which a similar lower clutch disc is to engage. For convenience in machining, the cam surface may be partially cut away as indicated at 52 without adversely affecting the clutch action.

In addition to having sufficient area in the several clutch teeth to accommodate the bearing and shear stresses imposed on the disreefer, it is important that the clutch means be so designed that the force required to disengage the clutch will not be excessive. If this disengaging force is excessively large, a heavier spring is required and a slower functioning of the disreefer occurs. As an important feature of our disreefer, we form the tooth wall 50 at an acute angle $\theta$ with respect to the axis of the clutch disc and provide the cam surface 51 with an acute angle $\beta$ with respect to the face of that disc. Merely as an illustration, when using a steel disc of one inch diameter, we have found that an angle $\theta$ of about 8° and an angle $\beta$ of about 7° 35' will give satisfactory results for a substantial range of use.

Juxtaposed to the downwardly facing clutch disc 41 is the similar and companion lower clutch disc 36 (Fig. 11) having similar teeth with walls 53, cut out portions 54, and cam surfaces 55. This disc is mounted at the bottom of the stud in alignment with the upper clutch disc and as shown in Fig. 5 is normally held disengaged from the upper disc by the preloaded compression spring 38.

Considering now the spool 40, it will be seen in Figs. 5 and 18 that the lower end of the spool is enlarged to form a central region in which the upper clutch disc 41 is located and with a depending skirt section 60 about the periphery of that clutch disc. Within the skirt section, a plurality of cut away slots 61 are provided corresponding in number and shape to the projecting fingers 62 at the periphery of the cupshaped winder member shown in Figs. 12 and 13. At the supporting floor surface 63 of this winder member, a convenient means such as a slot 64 is provided for insertion of a suitable tool for effecting rotation of the winder member about its axis. Accordingly, with the disreefer assembled, as shown in Fig. 5 (but with the connecting means 34 removed), the operator may insert a tool in slot 64 and by rotation thereof may rewind spool 40 and its associated disreefing line.

Surrounding the thus described spool is the lower housing guide 31 (Fig. 16) comprising a lower cylindrical shell portion 70 formed with a recessed shoulder 71 upon which the lower end of the outermost and upper housing guide 32 is adapted to rest. At its upper end the lower housing guide is formed with an aperture 72 to receive stud 35 with a loose fit and has an interiorly extending shoulder 73 against which the upper end of the compression spring rests at all times. For weight savings, the opposite sides of the lower housing guide 31 through which the line is payed out, are cut away to an extent much greater than that required to permit the disreefing line wound on spool 40 to function. Thus, as a significant feature of the invention, the two sides 74 and 75 of the lower housing guide 31, as seen in Fig. 15, are formed with a surface area sufficient to give adequate engaging surface with the surface of the disreefing line wound on spool 40, to prevent inadvertent unwinding of that line prior to ejection of the parachute system from the airplane but with that engaging surface being as small as practicable in order to reduce excessive friction on the line. During the packing of the parachute system, it is important that the spool remain in fully wound condition. Therefore, we provide a space between the inner surface of sides 74 and 75 and the outer surface of spool 40 just sufficient to require a slight compression of the disreefing line material as it is wound into ready position. The resultant frictional holding has been found adequate to prevent undesired unwinding while at the same time not requiring an excessive pull by the disreefing line before unwinding can take place. In any event, the amount of frictional heat and abrasion generated should not be sufficient to degrade the reefing line material.

At its lower end (Fig. 14) the housing member 31 is provided with a set of bosses and recesses for interlocking engagement with a complementary set of bosses and recesses on a cap member forming part of the connector 34 as disclosed and claimed in the aforementioned Clore and Carter application.

As seen in Figs. 19 to 21, the disreefer structure includes an upper housing guide 32, which, with the above described structure, makes possible the significant non-twisting characteristic of our apparatus. This guide 32 comprises a hollow cylindrical member having a lower edge 80 adapted to seat upon shoulder 71 of the lower housing guide 31. At its upper end the upper housing guide has a threaded aperture 81 into which the upper end of stud 35 is engaged. A shoulder 82 provides a seat for the shoulder 73 of the lower housing guide 31, the shoulder of the lower housing guide being adapted to rest against that seat while the force value in the suspension line is below a predetermined value, as in Fig. 5, and to move away from that seat when the force value exceeds that predetermined value, as in Fig. 5A. For weight savings, the wall of the upper housing guide is reduced to a thin section as shown at 83 and 84. In limited regions at its opposite sides, however, the wall of the upper housing guide is provided with enlarged cross sections 85 and 86 within which longitudinal slots 42 and 43 are formed. These slots are formed with rounded edges, as shown, and the flexible disreefing line, as it is unwound, bears against these edges as a fulcrum. As will later appear, the two ends 22L and 22R of our disreefing line tend to exert the same torque upon the upper housing guide and its associated structure, but since the two ends of that line exert mutually opposing torques, the net result is that no twisting of the assembly takes place. As a further significant feature, the only line wear taking place during disreefing is that caused by the engagement of the line with rounded wall sections 85 and 86. Thus, no snubbing, which could cause high temperatures in the line, results as the line is payed out.

As shown (at Fig. 19), the upper end of the upper housing guide is, like the lower end of the lower housing guide 31, provided with means for interlocking engagement with a cap comprising part of the connector 33, as shown in said Clore and Carter application. Each of these caps can be rotated and thus readily connected or disconnected, as desired, only the cap associated with the lower housing guide being normally disconnected when rewinding of the disreefing line for subsequent usage is intended. In parachute usage, the arrangement by which the disreefer is mounted between the parachute and the load so that it will infallibly function when subjected to either sudden or sustained loads and particularly so that it presents no protruding portions which might foul a line or its attachments, is of great importance. It will be noted that our entire disreefer satisfies these requirements.

With the foregoing explanation in mind, the operation of our apparatus may now be set forth.

The parachute system is packed in the conventional manner and, prior to usage, each of the disreefers 20 is in the ready condition, as shown in Fig. 5. It will be understood that the spring 38 is under a suitable compression commensurate with the various factors of usage earlier set forth. In its ready condition, the clutch disc 36 of the disreefer is thus held out of engagement with clutch disc 41 and the disreefing line is ready to unwind, being held, however, against inadvertent unwinding, due to the slight compression of that line between the surfaces 74 and 75 of the lower housing guide 31 and the surface of the rotatable spool member 40.

Figure 5A:
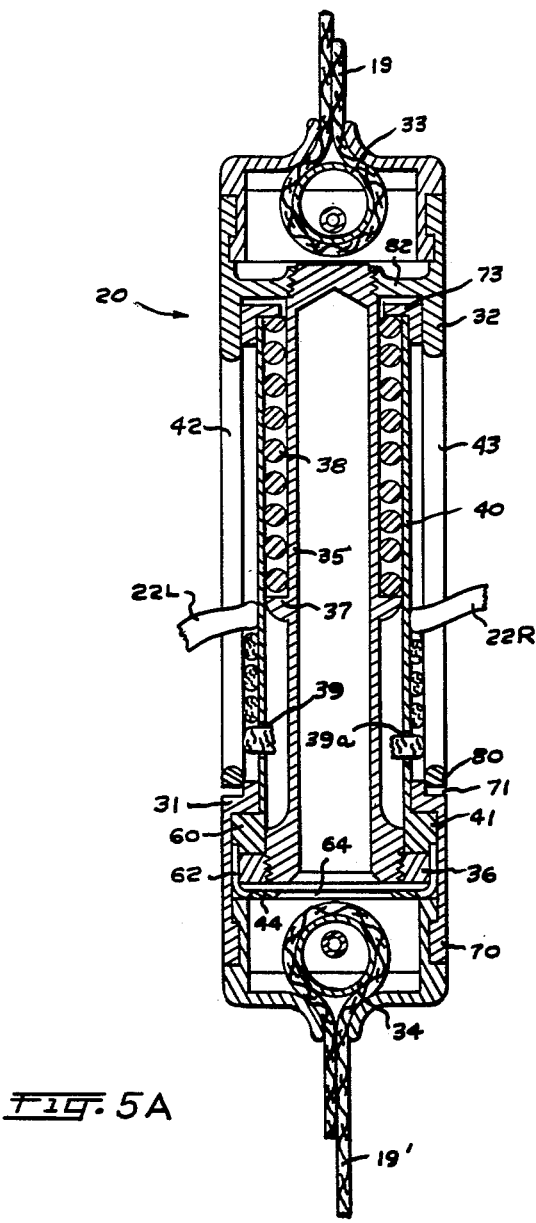
Fig. 5A is an assembly view similar to Fig. 5 and to a larger scale and showing the relation of the several parts of the disreefer while the full parachute force is being applied thereto and with a portion of the disreefing line being payed out.

Accordingly, when the parachute system is deployed from the aircraft, the drag force exerted thereon rapidly increases to value 13 (Fig. 1). During the time interval between the instant of deployment of the system and the reaching of that drag force value, the disreefer is free to pay out the disreefing line. However, since the compression spring 38 is chosen commensurate with the various load conditions, including the optimum loading (as indicated by line 14, Fig. 1), that spring holds upper clutch disc 41 out of engagement with lower clutch disc 36 until the drag in the attached suspension line portions 19 and 19¹ approximates the drag force value 13. As the drag force value increases in the portions 19 and 19¹ of the suspension line, the portion 19 pulls upon the upper housing guide 32 of the disreefer in one direction while the portion 19¹ pulls upon the lower housing guide 31 in the other direction causing the spring 38 to become further compressed. A displacement of the guided parts then takes place as best seen in Fig. 5A at which time the lower edge 80 of the upper housing guide is separated from the shoulder 71 of the lower housing guide, the shoulder 73 of the lower housing guide being commensurately separated from the shoulder 82 of the upper housing guide, and the confronting faces of the clutch discs 36 and 41 being brought into contact with each other. As these clutch discs engage, the tooth wall 50 of the rotatable upper disc contacts the cam surface 55 of the lower disc and slides into engagement with the juxtaposed tooth wall 53 of the same, while simultaneously the tooth wall 53 of the lower disc contacts the cam surface 51 of the upper disc as the respective tooth walls slide into contact. When so engaged, the clutch discs prevent further rotation of spool 40 and further paying out of the disreefing line. Concurrently, the partially disreefed parachute balloons out (as, for example, in Fig. 3) and decelerates the system with an accompanying decrease in the drag force. The amount of decrease in that force required to render disreefer 20 effective once more is relatively small, and the means by which this feature is obtained forms an important part of our invention. It will be understood that elasticity of the disreefing and suspension lines and canopy material, as well as inertia of the spring and other disreefer parts, all play a role in determining the rapidity at which the disreefer assembly can function. However, despite these inherent factors, the decrease in drag force required to permit the next step of disreefing, is relatively small due to the arrangement of the inclined teeth 50 and 53 on the clutch discs. In general, the force required to disengage the clutch is a function of the coefficient of friction of the clutch materials, the force of the reefing line pull and the angle $\theta$. We have found that by using these inclined teeth on the clutch discs, the drag force of the parachute system does not even have to diminish as much as the value of the spring compression force, before the next increment of disreefing occurs.

Consequently, as soon as the initial disreefing is interrupted at the initial force value 13 and the parachute system decelerates, the upper clutch tooth 50 slides over the top of the lower clutch tooth 53 along angle $\theta$ and the second increment of disreefing is initiated. Immediately the parachute canopy 17 balloons out further, the drag force increases, and the clutches are reengaged. This process continues as generally indicated in Fig. 1 until the parachute is fully opened, as shown in Fig. 4, at which time the force value falls to that represented by line 15, constituting the value at terminal velocity.

The gradual disreefing thus described demands no malfunctioning of the disreefer apparatus and this requirement is met in large part by the feature of having an apparatus which is non-twisting and which provides surfaces which are not susceptible to snagging. On this latter feature, more fully described in the aforementioned Clore and Carter application, the caps associated with connections 33 and 34 present smooth surfaces which are especially important during the parachute packing procedure. Moreover, the connections are designed to withstand both sudden shock and sustained loads without introducing rotary motion into the disreefer housing.

As to the first feature, it will be seen that the disreefer line 22 is doubly wound in the same direction (Fig. 18) so that pull on ends 22L and 22R in opposite directions turns the spool 40 in a single direction. The slots 42 and 43 in the upper housing guide 32 lie on opposite sides of a median longitudinal plane through the disreefer, normal to the plane of Fig. 5, and preferably are equally distant from that median plane. As the canopy distends and imposes a pull on end 22L for example, this portion of the line bends about surface 86 of the housing guide, and tends to turn the disreefer clockwise (Fig. 20). However, at the same time, end 22R, exerting an identical pull, bends about surface 85 and tends to turn the disreefer counterclockwise. These balanced forces, accordingly, allow the drag force in suspension line portions 19 and 19¹ to hold the disreefer in an established plane without twisting. The use of a plurality of disreefers permits each disreefer to store a smaller length of line than would be required if only a single disreefer were employed. Each disreefing line may thus be payed out at smaller line velocities, to accomplish an opening of the canopy in a given time, and friction can thus be reduced. In lieu of special snubbing means, it has been found that the bending of the flexible line 22 about surfaces 85 and 86 provides ample frictional engagement and that excessive heating and wear of the disreefing line is obviated. Reuse of the same disreefing line and disreefing structure is thus made possible, reducing the cost of the equipment. After initial use, the lower cap of the disreefer can be removed, the winder turned to rewind the line 22 on spool 40, the cap replaced, and the disreefer packed for the next usage.

While we have shown a particular embodiment of our invention, it will be understood, of course, that we do not wish to be limited thereto, since many modifications can be made; and we, therefore, contemplate by the appended claims to cover any such modifications as fall within the true spirit and scope of our invention.

What we claim as new and desire to secure by Letters Patent of the United States, is:

1. In a parachute disreefer, a rotatable member having a disreefing line wound thereon with the ends of said line attached at spaced points to a parachute canopy, and means enclosing said rotatable member and having spaced openings directing the outward passage of the line therethrough as the member is rotated in an unwinding direction, said openings being located on opposite sides of a median longitudinal plane through said enclosing means whereby twisting of the disreefer is substantially eliminated as the line is payed out in opposite directions.

2. Apparatus as defined in claim 1 including means attached to said rotatable member for selectively rotating the same in a direction opposite to its unwinding direction thereby to restore the disreefing line for subsequent usage.

3. A continuous disreefing parachute system including a parachute canopy, a load, and a suspension line connected to said canopy and said load, a disreefer interposed in said suspension line between said canopy and said load and having an upper housing guide and a lower housing guide, said guides being axially movable with respect to each other between a first and a second position in dependence upon the drag force existing in said suspension line, a rotatable member mounted interiorly of said guides, a disreefing line wound upon said member with the ends of said disreefing line attached to said canopy, and means responsive to the value of the drag force in said suspension line for restraining said member against rotation and against pay-out of said disreefing line while said guides occupy said second position and for permitting said member to rotate and to pay out said disreefing line while said guides occupy said first position.

4. A continuous disreefing parachute system including a parachute canopy, a load, and a plurality of suspension lines connected to said canopy and said load, a plurality of disreefers interposed in a plurality of corresponding suspension lines between said canopy and said load with the number of disreefers being less than the total number of suspension lines in the system, each disreefer having an upper housing guide and a lower housing guide, said guides being axially movable with respect to each other between a first position and a second position in dependence upon the drag force existing in the corresponding suspension line, a rotatable member mounted interiorly of said guides, a disreefing line wound upon said member with the ends of said disreefing line attached to said canopy, and means responsive to the value of the drag force in the corresponding suspension line for restraining said member against rotation and against paying out of said disreefing line while said guides occupy said second position and for permitting said member to rotate and to pay out said disreefing line while said guides occupy said first position.

5. In a parachute system having a parachute canopy, a load, and a suspension line connected to said canopy and said load, means for disreefing said parachute comprising a disreefing line having its ends attached to said canopy, a disreefer including an elongated rotatable member with the central portion of said disreefing line wound thereon, an upper housing guide and a lower housing guide mounted in surrounding relation to said rotatable member, said guides being relatively displaceable in an axial direction between a first position and a second position in dependence upon the drag force existing in said suspension line, resilient means disposed interiorly of said guides and normally holding said guides in said first position with a predetermined first force, a clutch mounted within said disreefer for controlling the rotation of said rotatable member and adapted to restrain said rotatable member against rotation while said guides occupy said second position and to permit said member to rotate while said guides occupy said first position, means connecting said upper housing guide to said parachute and means connecting said second housing guide to said suspension line whereby drag forces set up in said suspension line may be transmitted to said disreefer to cause the movement of said guides to said second position when the value of said drag force exceeds the value of said predetermined first force.

6. Apparatus as defined in claim 5 wherein said clutch comprises a first clutch disc attached to said rotatable member and a second clutch disc attached to said upper housing guide in confronting relation to said first clutch disc.

7. Apparatus as defined in claim 6 wherein the facing surfaces of each of said clutch discs includes clutch teeth formed with a wall inclined at an acute angle with respect to the axes of said clutch discs.

8. Apparatus as defined in claim 5 wherein said rotatable member is disposed within said lower housing guide in abutting endwise contact therewith thereby to cause movement of said member axially as said lower housing guide moves to said second position.

9. Apparatus as defined in claim 5 including a stud disposed interiorly of said rotatable member and affixed at one end to said upper housing guide, and wherein said resilient means comprises a spring interposed between said stud and said lower housing guide.

10. Apparatus as defined in claim 5 wherein said disreefing line is held frictionally between adjacent surfaces of said surrounding lower housing guide and said rotatable member surrounded thereby.

11. Apparatus as defined in claim 5 including means attached to said rotatable member adjacent one end thereof for rotating said member in a reverse direction thereby to rewind the central portion of said disreefing line about said rotatable member in preparation for reuse of said disreefing line.

12. Non-twisting apparatus for disreefing a parachute comprising a disreefing line having its ends attached to the canopy of said parachute, a disreefer including an elongated rotatable member with the central portion of said disreefing line wound thereon in a pattern causing rotation of said member in one direction as the ends of said disreefing line are payed out in opposite directions under influence of the pull of said canopy upon those ends, an upper housing guide and a lower housing guide mounted in laterally surrounding relation to said rotatable member, said guides being displaceable relative to each other in an axial direction between a first position and a second position, resilient means interposed between said upper and lower housing guides and normally holding the same in said first position with a predetermined first force, means responsive to the drag force exerted upon said parachute for moving said guides to said second position when the value of said drag force exceeds said first force, a clutch member having a first clutch disc attached to one end of said rotatable member and a second clutch disc attached to said upper housing guide in confronting relation to said first clutch disc, said discs being disposed out of contact with each other, when said guides occupy said first position and in contact with each other when said guides occupy said second position, and aperture extending longitudinally of each of said upper and lower housing guides through which said disreefing line wound upon said rotatable member may be payed out as said member rotates during the occupancy of said guides in said first position and during the pull of said ends of said disreefing line upon said rotatable member.

13. Apparatus as defined in claim 12 wherein said apertures in said upper housing guide through which the respective ends of said disreefing line passes lie on opposite sides of a median longitudinal plane through said disreefer.

14. Apparatus as defined in claim 13 wherein said apertures comprise elongated slots having internally disposed frictional bearing surfaces against which said disreefing line bends as it is payed out, thereby to establish mutually opposing torques upon said upper housing guide as the two ends of the disreefing line are simultaneously payed out in opposing directions.

15. In a parachute disreefer, a rotatable member having the central region of a disreefing line wound thereon with the ends of said line attached to a parachute canopy, and means enclosing said rotatable member and having spaced openings generally parallel to the axis of said member for directing the passage of the line therethrough as the member is rotated in an unwinding direction, said openings being located on opposite sides of a median longitudinal plane through said enclosing means whereby twisting of the disreefer is substantially eliminated as the line is payed out in opposite directions, the inner surface of said enclosing means and the outer surface of said member having configurations serving to confine one portion of the central region of said line therebetween in compressed form and another portion of the central region of said line therebetween in uncompressed form thereby to reduce friction upon said line.

16. Apparatus as defined in claim 15 wherein said rotatable member is cylindrical in form and the central region of said line is wound thereon in a pattern causing rotation of said member in one direction as the ends of said line are payed out in opposite directions.

References Cited in the file of this patent
UNITED STATES PATENTS

| | | |
|---|---|---|
| 2,626,117 | Heinrich | Jan. 20, 1953 |
| 2,709,054 | Roth | May 24, 1955 |
| 2,732,153 | Frieder et al. | Jan. 24, 1956 |
| 2,755,550 | Benjamin | July 24, 1956 |